(12) United States Patent
Sabio et al.

(10) Patent No.: US 8,366,825 B2
(45) Date of Patent: Feb. 5, 2013

(54) RAPID BINDER COMPOSITIONS CONTAINING A CALCIUM SALT FOR CONCRETE COMPONENTS AND STRUCTURES

(75) Inventors: Serge Sabio, Saint Just Chaleyssin (FR); Bruno Pellerin, Avon (FR); Christophe Levy, Saint Marcel Bel Accueil (FR); Serge Ghilardi, Mery (FR)

(73) Assignees: Chryso, Issy les Moulineaux (FR); Lafarge, Paris (FR)

( * ) Notice: Subject to any disclaimer, the term of this patent is extended or adjusted under 35 U.S.C. 154(b) by 869 days.

(21) Appl. No.: 11/916,808

(22) PCT Filed: Jun. 9, 2006

(86) PCT No.: PCT/FR2006/001310
§ 371 (c)(1),
(2), (4) Date: Aug. 28, 2008

(87) PCT Pub. No.: WO2006/131659
PCT Pub. Date: Dec. 14, 2006

(65) Prior Publication Data
US 2008/0308013 A1    Dec. 18, 2008

(30) Foreign Application Priority Data
Jun. 10, 2005    (EP) .................................... 05291257

(51) Int. Cl.
    *C04B 24/16*    (2006.01)
(52) U.S. Cl. ......... 106/724; 106/725; 106/819; 106/823
(58) Field of Classification Search ................. 106/724, 106/819, 823, 725
    See application file for complete search history.

(56) References Cited

U.S. PATENT DOCUMENTS

| | | | | |
|---|---|---|---|---|
| 3,427,175 A | | 2/1969 | Angstadt et al. | |
| 4,092,109 A | * | 5/1978 | Rosenberg et al. | 422/7 |
| 4,116,706 A | * | 9/1978 | Previte | 106/727 |
| 4,285,733 A | * | 8/1981 | Rosenberg et al. | 106/640 |
| 4,318,744 A | * | 3/1982 | Dodson | 106/708 |
| 5,203,629 A | * | 4/1993 | Valle et al. | 366/2 |
| 5,340,385 A | * | 8/1994 | Arfaei et al. | 106/14.05 |
| 5,348,583 A | * | 9/1994 | Arfaei et al. | 106/696 |
| 5,840,114 A | * | 11/1998 | Jeknavorian et al. | 106/802 |
| 5,879,445 A | | 3/1999 | Guicquero et al. | |
| 6,355,100 B1 | * | 3/2002 | Hamabe et al. | 106/808 |
| 6,641,658 B1 | * | 11/2003 | Dubey | 106/705 |
| 6,793,730 B2 | * | 9/2004 | Reddy et al. | 106/677 |
| 6,858,074 B2 | * | 2/2005 | Anderson et al. | 106/724 |
| 6,869,474 B2 | * | 3/2005 | Perez-Pena et al. | 106/727 |
| 6,916,369 B2 | * | 7/2005 | Chun et al. | 106/823 |
| 7,029,527 B2 | | 4/2006 | Gaudry et al. | |
| 7,588,635 B2 | * | 9/2009 | Yamakawa et al. | 106/805 |
| 7,883,577 B2 | * | 2/2011 | Sprouts et al. | 106/724 |
| 8,167,997 B2 | * | 5/2012 | Gray | 106/724 |
| 2003/0127026 A1 | | 7/2003 | Anderson et al. | |
| 2004/0149174 A1 | * | 8/2004 | Farrington et al. | 106/802 |
| 2008/0202388 A1 | * | 8/2008 | Raynaud et al. | 106/695 |
| 2010/0291305 A1 | * | 11/2010 | Wittbold et al. | 427/372.2 |

FOREIGN PATENT DOCUMENTS

| | | |
|---|---|---|
| CN | 1205680 A | 1/1999 |
| EP | 0537872 A1 | 4/1993 |
| FR | 2810314 A1 | 12/2001 |
| GB | 2033367 A | 5/1980 |
| GB | 2058037 A | 4/1981 |
| JP | 2000-281412 A | 10/2000 |
| WO | 94/08913 A1 | 4/1994 |
| WO | 9715535 A1 | 5/1997 |

OTHER PUBLICATIONS

"Characteristics of the structure of concrete and the phase composition of cement stone based on slag portland cement with the superplasticizer NF" Raminov et al. Zhurnal Prikladnoi Khimii (Sankt-Peterburg, Russian Federation), 1982. abstract only.*

* cited by examiner

*Primary Examiner* — Paul Marcantoni
(74) *Attorney, Agent, or Firm* — Marsh Fischmann & Breyfogle LLP

(57) ABSTRACT

The invention concerns a fast binder comprising; cement; at least one superplasticizer; calcium nitrite; and at least one formic derivative. The invention also concerns concrete mixtures obtained from said binder and methods for making same.

26 Claims, No Drawings

RAPID BINDER COMPOSITIONS CONTAINING A CALCIUM SALT FOR CONCRETE COMPONENTS AND STRUCTURES

TECHNICAL FIELD

The subject of the invention is rapid binder compositions based on a calcium salt that are used for the manufacture of concrete components and structures.

Rapid binders for mortar or concrete are understood to mean quick setting and hardening binders. Concretes using such binders in their compositions, once applied, acquire high mechanical properties in the short term. They preferably have a compressive strength CS of at least 1 MPa at 4 hours in the case of fluid concretes and at least 1 MPa at 5 hours in the case of self-placing (or self-compacting) concretes and of at least 12 MPa at 24 h.

These concretes are fluid or self-placing (or self-compacting) concretes and have a workability time of a minimum of 1 hour up to a maximum of 2 hours.

The workability of fluid concretes is measured by the slump height using an Abrams cone—or the slump value—(according to French standard NF P 18-451 of December 1981) and it is estimated that a concrete is fluid when this slump is at least 150 mm, preferably at least 180 mm.

The workability of self-placing (or self-compacting) concretes is generally measured by the slump flow, according to the operating method described in *Specification and Guidelines for Self-Compacting Concrete*, EFNARC, February 2002, pages 19-23; the flow spread is more than 650 mm for self-compacting concretes (and in general less than 800 mm).

The invention relates to concretes, and more particularly to fluid or self-placing (or self-compacting) concretes, intended for the production of components and structures, whether factory-prefabricated components or on-site constructions, for example concrete shelves, slabs, etc.

TECHNICAL BACKGROUND

FR-A-2810314 describes a rapid binder for self-compacting concrete comprising Portland cement, calcium aluminate, calcium sulfate, an accelerator, a retarder and a superplasticizer of the polyphosphonate-polyox type. In that document, it is indicated that this binder makes it possible to achieve a workability of longer than 1 hour, and to pump the concrete thanks to this self-compacting formulation, while still having a high compressive strength at 6 hours and at 24 hours, including at temperatures between 10° C. and 35° C. The applications described in that document are the emergency repair of structures and the temporary support for tunnels, galleries or other similar structures. There is no mention of concrete shell applications.

U.S. Pat. No. 3,427,175 describes compositions comprising an accelerator system containing a calcium nitrite. This document also describes a cure at a temperature that is not compatible with the outdoor temperatures conventionally encountered on building sites.

JP-A-2000281412 describes accelerator systems containing a calcium salt, which is calcium sulfite or sulfate, in combination with an organic adjuvant and a superplasticizer. It is indicated that compressive strength is obtained in a relatively short time, but the data provided are only data obtained at 24 hours.

GB-A-2033367 and GB-A-2058037 describe accelerator systems comprising a calcium aluminate mixed with calcium sulfate, a hydroxyacid (for example citric acid) and an inorganic salt (for example a nitrite or nitrate, sodium carbonate being indicated as preferred).

EP-A-537872 describes an accelerator system comprising a nitrite or nitrate, for example calcium nitrite or nitrate, combined with a specific copolymer superplasticizer.

A few commercial products are also known. Products from SIKA, in particular Sikaprise SC2, containing calcium nitrate, sodium thiocyanate and formaldehyde, may be mentioned. Products from GRACE, in particular Polarset, containing calcium nitrite, calcium nitrate (and bromide salts), a small amount of thiocyanate and methyldiethanolamine, may also be mentioned. Products from MBT, especially combination products, accelerator Pozzolith NC 534, high water-reducing superplasticizer Glenium 3030 and retarder Delvo, may also be mentioned.

US 20030127026 (U.S. Pat. No. 6,858,074) describes an accelerator system comprising, in combination: a polycarboxylate-type superplasticizer, an accelerator and a retarder. The accelerator may be chosen in particular from alkaline-earth metal nitrites, thiocyanates, halides, salts, especially calcium salts of acids, for example formic acid, etc. It does not describe mixing these components. One retarder is in particular a carboxylic acid. The flexural strength is indicated as being at least 2.8 MPa and the compressive strength as being at least 15 MPa, in a time of 4 hours after pouring, at a temperature of between 10° C. and 38° C.

The cementious compositions according to this invention have a workability retention time limited to a maximum of 30 minutes, a high cement content and low water/cement ratios, of between 0.25 and 0.40.

US 20040149174 describes a system similar to the one which is the subject of the preceding application, but in combination with a salt for lowering the freezing point of the mix. Combinations of a polycarboxylate-type superplasticizer, of a freezing-point-lowering salt (alkaline-earth metal nitrites are mentioned), of an accelerator (thiocyanates and halides are mentioned) and of a retarder (carboxylic acids are mentioned) are claimed. The examples do not specify the precise compounds used, nor do they provide information about the workability retention and the mechanical strength obtained at 4 or 6 hours. They relate to concretes that are not fluid or self-compacting concretes. The properties were studied at temperatures which in certain cases were around −1° C.

However, there is still a need for a method of manufacturing concrete components and structures using rapid binder compositions, having a long workability retention, resulting in short-term mechanical strength being rapidly achieved even at temperatures below 10° C., and thus making it possible to increase the rate at which formwork can be reutilized.

SUMMARY OF THE INVENTION

One subject of the invention is a rapid binder comprising:
cement;
at least one superplasticizer;
calcium nitrite; and
at least one formic derivative.

According to a particular embodiment, the formic derivative is formaldehyde or the formaldehyde bisulfite of an alkali or alkaline-earth metal.

According to a particular embodiment, the rapid binder comprises:
99 to 95% of Portland cement;
1 to 5%, of the components:
at least one superplasticizer;
calcium nitrite; and
at least one formic derivative.

According to a particular embodiment, the amount of calcium nitrite in the binder is between 1.5 and 5%, by weight relative to the binder.

According to a particular embodiment, the amount of formic derivative, relative to the calcium nitrite salt, is between 2 and 5%.

According to a particular embodiment, the amount of superplasticizer, considered as solids content, in the binder is between 0.2 and 2% by weight, relative to the weight of the binder.

According to a particular embodiment, the rapid binder further comprises at least one additive conventionally used in concrete.

Another subject of the invention is an accelerator system comprising at least one superplasticizer, calcium nitrite and at least one formic derivative. The components may be as described in relation with the rapid binder of the present invention.

Yet another subject of the invention is a wet mortar or concrete composition comprising a rapid binder according to the invention mixed with water.

According to a particular embodiment, the above composition is a fluid concrete having a 90-minute slump of at least 15 cm, preferably at least 18 cm.

According to a particular embodiment, the above composition has, after hydraulic setting, a 4-hour compressive strength of at least 1 MPa.

According to a particular embodiment, the above composition is a self-placing concrete.

According to a particular embodiment, the above composition is a self-placing concrete having a 90-minute flow spread of more than 650 mm.

According to a particular embodiment, the above composition has, after hydraulic setting, a 5-hour compressive strength of at least 1 MPa.

According to a particular embodiment, the above composition has a workability of between 1 and 2 hours.

Another subject of the invention is a method of preparing mortar or concrete by mixing a rapid binder according to the invention and aggregates with water, in particular carried out at a temperature of 10° C. or below.

According to a particular embodiment, the calcium nitrite is introduced 20 to 60 minutes after the other components of the rapid binder have been mixed with the aggregates and water.

Finally, the invention provides a method of producing mortar or concrete objects with double formwork struck in one day, said double formwork being struck at a temperature of 10° C. or below.

According to a particular embodiment, said method is used for the formation of concrete shells.

DESCRIPTION OF EMBODIMENTS OF THE INVENTION

The invention will now be described in greater detail in the description that follows.

The invention is based on a combination of additives containing at least one accelerator system.

The accelerator system according to the invention comprises at least three elements, namely a calcium salt, which is calcium nitrite, a specific organic adjuvant, which is a formic derivative, and a superplasticizer.

The calcium salt is calcium nitrite. This salt is present in the composition of the accelerator in amounts that may vary from 50 to 90% by dry weight. In general, the amount is such that the amount of calcium nitrite in the final binder is between 0.5 and 10%, preferably between 1.5 and 5%, by dry weight relative to the final binder.

The formic derivative may be in aldehyde form, namely formaldehyde (it being understood that polymers, for example urea-formaldehyde, are not formic derivatives within the meaning of the invention insofar as there is no release of the formaldehyde monomer—or formic acid or salt). The formic derivative may be in formic acid form, optionally in a salt form with an alkali or alkaline-earth metal. The formic derivative may be formaldehyde, formic acid or a salt form of an alkali or alkaline-earth metal, or the formaldehyde bisulfite of an alkali or alkaline-earth metal, especially sodium formaldehyde bisulfite or the formaldehyde sulfoxide of an alkali or alkaline-earth metal such as sodium formaldehyde sulfoxylate (commercially available as Rongalite®).

The simple or bisulfitic aldehyde forms (of an alkali or alkaline-earth metal) are preferred, even though all other forms can be used.

The formic derivative is present in the composition of the accelerator in amounts that may vary from 1 to 5% by weight. In general, the amount is such that the amount of formic derivative, relative to the calcium nitrite salt, is between 1 and 10% and preferably between 2 and 5% of the amount of calcium nitrite. The amount is such that the amount of formic derivative is between 0.01 and 1%, preferably between 0.05 and 0.5%, by weight relative to the weight of final binder.

The superplasticizer is any superplasticizer used in the industry, such as those defined in European Standard EN 934-2.

Superplasticizers that are of the polyphosphonate-polyox or polysulfonate-polyox type, or better still of the polycarboxylate-polyox (PCP) type may be used. An example of a superplasticizer is the one described in documents EP-A-537872, EP-A-663892, US20030127026 and US20040149174, these being incorporated herewith by reference.

One example of a superplasticizer is that obtained by polymerizing:

at least one ionic monomer of the phosphonic, sulfonic or carboxylic, preferably carboxylic type, and advantageously of the (meth)acrylic type; and at least one monomer of the polyethylene glycol (PEG) (meth)acrylate type, in particular PEG methyl ether (in terminal position), the molecular weight of which is for example between 100 and 10,000, preferably between 500 and 5,000 and advantageously between 750 and 2,000.

The first monomer/second monomer molar ratio may vary widely, for example from 75/25 to 45/55, preferably 65/35 to 55/45.

It is possible to use one or more third monomers, for example those selected from:

(a) the acrylamide type, for example N,N-dimethylacrylamide, 2,2'-dimethylamino(meth)acrylate or its salts, a 2,2'-dimethylaminoalkyl(meth)acrylate or its salts with the alkyl group being in particular ethyl and propyl, and in general any monomer containing a function of amine or amide type;

(b) the hydrophobic type, for example $C_1$ to $C_{18}$ alkyl (meth)acrylates, in particular ethyl or methyl(meth)acrylates.

The quantity of this third monomer may be between 5 and 25 mol % of the total of the monomers.

One particular example of a superplasticizer used in the invention is the one obtained by polymerizing 40 to 65% of (meth)acrylic acid, 25 to 40% of PEG methyl ether (meth) acrylate, especially having a molecular weight of between 750 and 2,000, and 5 to 25% of a monomer of the (a) or (b) type, in particular of the (a) type and especially a 2,2'-dimethylaminoalkyl(meth)acrylate.

Another example is a polycarboxylate polyox containing from 10 to 30 mol % N-methylol acrylimide or a derivative thereof.

The superplasticizers are present in a form that may vary from liquid form to solid form, passing through the waxy form.

This superplasticizer is present in the composition of the accelerator system in amounts that may vary from 10 to 30% by weight, the % amounts being calculated with respect to the solids contents of the constituents of the system. The content of the superplasticizer relative to the binder is in general between 0.1 and 5% by weight (% values calculated on the basis of the solids content of the superplasticizer), preferably between 0.1 and 2% by weight relative to the weight of the binder. For a liquid superplasticizer, in general, this will preferably be in an amount of 1 to 10 l/m$^3$, preferably 2 to 7 l/m$^3$, of the final concrete mix.

The binder or accelerator system may contain, in addition to the three aforementioned compounds, other components. In particular, the following compounds, by themselves or as admixtures, may be mentioned:

(i) alkali or alkaline-earth metal or aluminum thiocyanate;
(ii) alkali or alkaline-earth metal or aluminum halide or halogenate;
(iii) alkali or alkaline-earth metal or aluminum nitrate;
(iv) amine, alkanolamine or polyhydroxyalkylamine;
(v) alkali or alkaline-earth metal or aluminum thiosulfate;
(vi) alkali or alkaline-earth metal or aluminum hydroxide;
(vii) alkali or alkaline-earth metal or aluminum salt of a carboxylic acid, the acid being different from formic acid;
(viii) ether oxide; and
(ix) sugars.

For example, calcium, sodium or potassium thiocyanate and/or bromide will be used as calcium nitrite co-accelerators.

The amount of these other compounds combined with the accelerator system may represent for example up to 20% by weight of the calcium nitrite.

Such a combination makes it possible to achieve certain improvements in the compromise between rheology control and rapid performance acquisition.

The binder intended to form the wet concrete comprises in general, relative to the dry weight of the binder:

99.5 to 90% Portland cement;
0.5 to 10% accelerator system.

Advantageously, the binder comprises:

99 to 95% Portland cement;
1 to 5% accelerator system.

The Portland cement is conventional and complies with the families described in European standard EN 197-1. It will be possible to use for example a CEM1 52.5 N or R cement, or a CEM2 cement of the 32.5, 32.5 R, 42.5 or 42.5 R type. The cement may be of the HIS (High Initial Strength) type.

Advantageously, the Portland cement is a cement preferably ground to a fineness of at least 4000 cm$^2$/g.

The content of soluble alkalis will preferably be less than 1%, advantageously less than 0.6%, by weight expressed as Na$_2$O equivalent. Advantageously, the amount of C4AF is less than 8% by weight, advantageously less than 4% by weight, and the amount of C3S of the initial clinker is more than 60% by weight.

The final amount of the accelerator system depends on the temperature of use of the concrete, on the precise implementing process, on the strength level to be achieved, etc. Moreover, this amount is adjusted according to the final amounts of the various components in the final concrete mix.

The concrete comprising this superplasticizer is advantageously a fluid or self-compacting (self-placing) concrete.

In addition to the accelerator system, it may contain other types of additives commonly employed in concretes.

As examples of additives that may be used, mention may be made of the following: air entrainers, antifoaming agents, corrosion inhibitors, shrinkage-reducing agents, fibers, pigments, rheology modifiers, hydration precursors, water-soluble polymers, pumping aids, alkali reaction reducers, reinforcing agents, water-repellant compounds and admixtures thereof.

The compounds of the final concrete composition may be employed in the following order:

according to a first embodiment, all of the components of the accelerator system are added right from the start, during mixing of the concrete, in the concrete batching plant; the cement and the entire accelerator system, namely calcium nitrite, formic derivative and superplasticizer, are mixed together. The mixing in the concrete batching plant may be carried out either in a fixed mixer, or in a mixer truck when this is used directly as mixer. The invention therefore relates to the method in which all of the components are introduced right from the mixing of the rapid binder with the aggregates and water; or according to a second embodiment, the calcium nitrite will be added after the other components of the accelerator system, for example in the mixer truck, before the latter departs from the concrete batching plant, or during its travel between the batching plant and the site, or on the site just before pouring. The invention therefore also relates to the method in which the calcium nitrite is introduced after the other components of the rapid binder have been mixed with the aggregates and water.

According to the second embodiment, the times chosen for this delayed introduction may be from 10 to 90 minutes, preferably 20 to 60 minutes, after the mixing with the other components of the accelerator system, superplasticizer and/or formic derivative. The invention therefore also relates to the method in which the calcium nitrite is introduced 10 to 90 minutes, preferably 20 to 60 minutes, afterwards.

The first embodiment will be preferred as the various constituents (cement, components of the accelerator system) may then all be added and metered precisely, in a single step, in the concrete batching plant.

The weight ratio of effective water to dry binder (W/C ratio) is in general between 0.45 and 0.65.

The final composition includes conventional aggregates (sand, gravel and/or chippings). Preferably, the constituents of the final composition have a size of 20 mm or less, preferably 10 mm or less in the case of self-placing (or self-compacting) concretes. The composition can thus be easily pumped.

The aggregates-to-binder dry weight ratio is in general between 4 and 5.

The concrete compositions according to the invention are easy to use and are of low cost. They have a suitable rheology, preferably implying a workability time (after mixing) of at least one hour and at most one and a half hours to two hours, and a very rapid hardening. The workability of these concretes according to the invention is in general between 1 and 2 hours. The term "workability time" is understood to mean the time during which the concrete remains fluid, which corresponds to the time before setting starts. In general, the slump values (of fluid concrete) are at least 15 cm, preferably at least 18 cm.

The concrete according to the invention may be a fluid concrete, especially a fluid concrete having a 90-minute slump of at least 15 cm, preferably at least 18 cm. It may have a compressive strength, as soon as 4 hours after the end of mixing, of the order of at least 1 MPa and preferably at least 2 MPa, and a 24-hour compressive strength of at least 12 MPa, measured on cylindrical specimens measuring 16 cm×32 cm.

The concrete according to the invention may also be a self-placing concrete, especially a self-placing concrete having a 90-minute flow spread of more than 650 mm. It may have a compressive strength, as soon as 5 hours after the end of mixing, of the order of at least 1 MPa and preferably at least 2 MPa, and a 24-hour compressive strength of at least 12 MPa, measured on cylindrical specimens measuring 16 cm×32 cm.

When the mixing takes place in a mixer truck, the time is taken from the instant the last constituent of the concrete composition is introduced into the truck.

These two properties of workability retention and high short-term strength make it possible in particular to produce a precursor concrete composition in the concrete batching plant and then to transport it to a site by mixer truck, the composition rapidly hardening once applied. These qualities of the binder also allow it to be mechanically pumped, thanks to its fluidity, and to be poured or pumped into formwork, resulting in rapid hardening. Thus, it will be possible to strike the formwork and then rapidly reuse it, so as to be able to pour a new batch of concrete thereinto.

The rapid binder for fluid or self-placing (self-compacting) concretes of the invention is easily pumpable or pourable, especially with no vibration in the case of self-compacting concretes, which makes it particularly suitable for example for the manufacture of concrete shells.

The invention is aimed most particularly at the manufacture of concrete shells, by pouring and/or pumping. The invention is useful for manufacturing concrete shells at outdoor temperatures especially between −5° C. and 30° C., in particular below 10° C. It will be recalled that a concrete shell is defined in masonry as "any solid vertical wall made of shuttered concrete".

Moreover, the invention also provides a method of manufacture, especially for concrete shells, allowing formwork to be struck twice in one day at temperatures of 10° C. or below, in particular making use of the accelerator system according to the invention. Indeed, the invention according to another embodiment provides such a method that therefore allows two concrete shells to be cast in one day, even at low temperatures. In fact, according to the invention, it has now been found that the compositions according to the invention, thanks to their rapid setting properties even at low temperature, make it possible for formwork to be struck twice in one day. It has also been found to be possible, as long as the compositions are rapid and maintain their workability, to break with the conventional approach, and strike formwork twice even at low temperatures.

EXAMPLES

The following examples illustrate the invention without limiting it.

Example 1

A mortar having the following composition (parts in kg/1.5 m³) was prepared:

| | |
|---|---|
| Portland cement CEM I | 863.0 |
| Limestone filler | 215.8 |
| 0-0.315 sand | 456.6 |
| 0.315-1 sand | 611.9 |
| 1-4 sand | 881.3 |
| water | 422.9 |

The W/C ratio was 0.49.

Various compositions were tested, all including a superplasticizer, which was Glenium 27 from MBT. The following compositions were tested:

A: type according to the invention (calcium nitrite with formaldehyde);
B: type based on Sikaprise SC2;
C: type based on Pozzolith NC534;
D: type based on Polarset.

A first series of trials was carried out with the following compositions:

| Composition | Glenium 27 | Accelerator |
|---|---|---|
| A1 | 0.35% | 3.15% invention (98 wt % nitrite, 2 wt % formaldehyde) |
| B1 | 0.26% | 3% Sikaprise SC2 |
| C1 | 0.27% | 3% Pozzolith NC534 |

With Saint Pierre La Cour cement, which is of the CEM1 52.5 N type according to the standard EN 197-1, the results obtained (at 20° C.) were the following:

TABLE 1

| | Slump* (in mm) | | |
|---|---|---|---|
| Composition | 60 min | 90 min | CS (in MPa) at 5 h 30 min |
| A1 | 290 | 279 | 4.7 |
| B1 | 275 | 229 | 1.3 |
| C1 | 280 | 238 | 3.1 |

*measured by means of a cone according to a ½ scale relative to the Abrams cone in the case of concrete mortars.

Composition A1 according to the invention has a 90-minute flow spread substantially greater than that obtained with compositions B1 and C1, differing by about 50 mm for a flow spread of more than 270 mm.

The strength after 5 h 30 min is also substantially improved. Moreover, the 4-hour strength of composition A1 is 2.5 MPa.

A second series of trials (the conditions remaining unchanged) was carried out with the following compositions:

| Composition | Glenium 27 | Accelerator |
|---|---|---|
| A2 | 0.35% | 3.15% invention (98 wt % nitrite, 2 wt % formaldehyde) |
| B2 | 0.24% | 3% Sikaprise SC2 |
| C2 | 0.30% | 3% Pozzolith NC534 |
| D2 | 0.26% | 3% Polarset |

With Le Havre cement, which is of the CEM1 52.5 N type according to the standard EN 197-1, the results obtained were the following:

TABLE 2

| Composition | Slump* (in mm) 60 min | Slump* (in mm) 90 min | CS (in MPa) at 5 h 30 min |
|---|---|---|---|
| A2 | 320 | 300 | 6.7 |
| B2 | 260 | 180 | 2.0 |
| C2 | 280 | 220 | 3.4 |
| D2 | 240 | <170 | 7.5 |

*measured by means of a cone according to a ½ scale relative to the Abrams cone in the case of concrete mortars.

With Le Havre cement, which is of the CEM1 52.5 N type, composition A2 according to the invention has a 90-minute flow spread substantially greater than that obtained with compositions B2, C2 and D2, differing by at least 80 mm for a flow spread of 300 mm.

The compressive strength at 5 h 30 min is also substantially improved over compositions B2 and C2 and is of the same order of magnitude as that of D2, despite a flow spread retention time that is more than twice as long.

Example 2

A concrete having the following composition (arts in kg/m$^3$) was prepared:

| Portland cement CEM I | 350 |
|---|---|
| BL200 filler | 100 |
| 0-4 sand | 765 |
| 4-14 aggregate | 1057 |
| total mixing water | 175 |

The W/C ratio was 0.5.

An Optima 203 superplasticizer and calcium nitrite, with a variable amount of formaldehyde relative to the weight of nitrite, were added.

The following compositions were prepared:

| Ex. | Optima | Nitrite + formaldehyde (dry/dry) | Nitrite/formaldehyde (% dry/dry) |
|---|---|---|---|
| A3 | 2.8 l/m$^3$ | 4% | 98.4/1.6 |
| A4 | 3 l/m$^3$ | 2.5% | 97.5/2.5 |
| A5 | 3.9 l/m$^3$ | 2.2% | 97.2/2.8 |

The following results were obtained at the following temperatures:

TABLE 3

| Composition | Temperature | 90-min slump (in mm) | CS at 4 h (MPa) | CS at 5 h 30 min (MPa) |
|---|---|---|---|---|
| A3 | 6° C. | 220 | 1.1 | 2.2 |
| A4 | 20° C. | 170 | 3.7 | 9.3 |
| A5 | 30° C. | 200 | 1.9 | 6.8 |

Example 3

This example provides the results obtained with a self-placing (self-compacting) concrete using SFB (sodium formaldehyde bisulfite) and the effect of the latter on the rheology and the acquisition of strength. The temperature was 20° C.

Two concrete compositions, having the following compositions (the percentage contents of calcium nitrite and sodium formaldehyde bisulfite are expressed relative to the cement), were prepared:

|  | A6 | A7 |
|---|---|---|
| Portland cement CEM I | 350 kg/m$^3$ | 350 kg/m$^3$ |
| Entrains filler | 183 kg/m$^3$ | 183 kg/m$^3$ |
| 0/4 Anneville sand | 760 kg/m$^3$ | 760 kg/m$^3$ |
| GSI fine sand | 85 kg/m$^3$ | 85 kg/m$^3$ |
| 3/8 La Brosse gravel | 720 kg/m$^3$ | 720 kg/m$^3$ |
| Total water | 220 kg/m$^3$ | 220 kg/m$^3$ |
| Glenium 27 | 3.4 l/m$^3$ | 3.4 l/m$^3$ |
| Calcium nitrite | 2.65% | 2.65% |
| Sodium formaldehyde bisulfite | 0.00% | 0.23% |
| 5-minute slump flow | 720 cm | 670 cm |
| 15-minute slump flow | 700 | 720 |
| 30-minute slump flow | 660 | 730 |
| 60-minute slump flow | 520 | 700 |
| 90-minute slump flow | 290 | 650 |
| 4-hour CS (MPa) | n.d. | 0.7 |
| 5-hour CS (MPa) | 1.2 | 2.2 |

The addition of sodium formaldehyde bisulfite increases the open time by at least 45 minutes.

Example 4

Trials were made on mortar with the following formula (parts in kg/m$^3$):

| Portland cement CEM I 52.5 Le Havre | 494.5 |
|---|---|
| Orgon limestone filler | 91.3 |
| Water-worn Mauzac 0/4 sand | 1406.5 |
| Water | 275.9 |

The various compositions tested were made at 20° C. with a superplasticizer (Glenium 27) from MBT. The first trial was made without sodium formaldehyde sulfoxylate (Rongalite®) and was compared with two different amounts of Rongalite®. An influence of this product on rheological retention at 90 minutes was noted.

The following results were obtained:

TABLE 4

| Calcium nitrite (%)/cement | % Rongalite/ cement | G27 (%) | Rheology | | | | | CS (MPa) | | | |
|---|---|---|---|---|---|---|---|---|---|---|---|
| | | | 5 min | 15 min | 30 min | 60 min | 90 min | 4 h | 4 h 30 | 5 h 30 | 7 h |
| 2.5 | | 0.14 | 330 | 330 | 305 | 230 | 130 | 2.1 | 3.3 | 6.0 | 13.3 |
| 2.5 | 0.097 | 0.17 | 330 | 335 | 340 | 315 | 305 | 1.1 | 2.3 | 5.3 | 10.1 |
| 2.5 | 0.071 | 0.15 | 340 | 335 | 340 | 290 | 235 | 1.6 | 2.7 | 5.4 | 11.6 |

Example 5

Trials were made on mortar with the following formula (parts in kg/m³):

| | |
|---|---|
| Portland cement CEM I 52.5 Le Havre | 494.5 |
| Orgon limestone filler | 91.3 |
| 0/0.315 Palvadeau sand | 329.0 |
| 0.315/1 Palvadeau sand | 329.0 |
| 1/4 Palvadeau sand | 748.5 |
| Water | 275.9 |

A beneficial effect of the Optima 175 additive was noted on the slump level at 90 min.
The following results were obtained:

TABLE 5

| | SP | Dry add./L | % Ca. nitr. | % formald | Strength (MPa) | | Slump (mm) | | | | |
|---|---|---|---|---|---|---|---|---|---|---|---|
| | | | | | CS 5 h 30 | CS 24 h | 5 min | 15 min | 30 min | 60 min | 90 min |
| 256 | Glenium 27 | 0.210 | 2.6 | 0.15 | 4.9 | 27.4 | 215 | 210 | 200 | 190 | 130 |
| 279 | Optima 203 | 0.150 | 2.6 | 0.15 | 6.6 | 29.1 | 200 | 190 | 185 | 150 | 100 |
| 281 | Optima 175 | 0.300 | 2.6 | 0.15 | 4.1 | 27.9 | 210 | 200 | 195 | 180 | 155 |

The invention claimed is:

1. A rapid binder comprising:
   cement;
   at least one superplasticizer;
   calcium nitrite; and
   at least one compound selected from the group consisting of sodium formaldehyde bisulfite and sodium formaldehyde sulfoxylate.

2. The rapid binder of claim 1, comprising:
   99.5 to 90 wt % of Portland cement;
   0.5 to 10 wt % of the components:
   at least one superplasticizer;
   calcium nitrite; and
   at least one compound selected from the group consisting of sodium formaldehyde bisulfite and sodium formaldehyde sulfoxylate.

3. The rapid binder of claim 1, in which the superplasticizer is a polycarboxylate-polyox or a polyphosphonate-polyox.

4. The rapid binder of claim 1, wherein the superplasticizer is obtained by polymerizing:
   at least one ionic monomer selected from the group consisting of phosphonic, sulfonic and carboxylic monomers; and
   at least one polyethylene glycol (PEG)(meth)acrylate monomer, the molecular weight of which is between 100 and 10,000; and optionally
   at least one third monomer selected from the group consisting of acrylamide and hydrophobic monomers.

5. The rapid binder of claim 4, wherein the first monomer/second monomer molar ratio is from 75/25 to 45/55 while the amount of third monomer, when present, is from 5 to 25 mol % of the total of monomers.

6. The rapid binder of claim 1, wherein the amount of calcium nitrite in the binder is between 0.5 and 10 wt %, by weight relative to the binder.

7. The rapid binder of claim 1, wherein the amount of compound selected from the group consisting of sodium formaldehyde bisulfite and sodium formaldehyde sulfoxylate, relative to the calcium nitrite salt, is between 1 and 10 wt % of the amount of calcium nitrite.

8. The rapid binder of claim 2, wherein the amount of superplasticizer, considered as solids content, in the binder is between 0.1 and 5 wt % by weight, relative to the weight of the binder.

9. The rapid binder of claim 1, which further includes at least one additive selected from the group consisting of air entrainers, antifoaming agents, corrosion inhibitors, shrinkage-reducing agents, fibers, pigments, rheology modifiers, hydration precursors, water-soluble polymers, pumping aids, alkali reaction reducers, reinforcing agents, water-repellant compounds and admixtures thereof.

10. The rapid binder of claim 1, which further includes a compound, by itself or as an admixture, selected from the group consisting of:
   (i) alkali or alkaline-earth metal or aluminum thiocyanate;
   (ii) alkali or alkaline-earth metal or aluminum halide or halogenate;
   (iii) alkali or alkaline-earth metal or aluminum nitrate;
   (iv) amine, alkanolamine or polyhydroxy alkylamine;
   (v) alkali or alkaline-earth metal or aluminum thiosulfate;
   (vi) alkali or alkaline-earth metal or aluminum hydroxide;
   (vii) alkali or alkaline-earth metal or aluminum salt of a carboxylic acid, the acid being different from formic acid;
   (viii) ether oxide; and
   (ix) sugars.

11. The rapid binder of claim 10, which further comprises calcium, sodium or potassium thiocyanate and/or bromide.

12. The rapid binder of claim 10, wherein the amount of the compound is up to 20% by weight of the calcium nitrite.

13. An accelerator comprising at least one superplasticizer, calcium nitrite and at least one compound selected from the group consisting of sodium formaldehyde bisulfite and sodium formaldehyde sulfoxylate.

14. A wet mortar or concrete composition comprising a rapid binder comprising cement, at least one superplasticizer, calcium nitrite, and at least one compound selected from the group consisting of sodium formaldehyde bisulfite and sodium formaldehyde sulfoxylate.

15. The composition of claim 14 mixed with a W/C ratio of between 0.45 and 0.65.

16. The composition of claim 14, which is a fluid concrete.

17. A method of preparing mortar or concrete by mixing i) a rapid binder comprising cement, at least one superplasticizer, calcium nitrite, and at least compound selected from the group consisting of sodium formaldehyde bisulfite and sodium formaldehyde sulfoxylate and ii) aggregates with iii) water.

18. The method of preparation of claim 17, wherein all of the components are introduced right from the mixing of the rapid binder with the aggregates and water.

19. The method of preparation of claim 17, wherein the calcium nitrite is introduced after the other components of the rapid binder have been mixed with the aggregates and water.

20. The method of preparation of claim 19, wherein the calcium nitrite is introduced 10 to 90 minutes afterwards.

21. The method of claim 17, carried out at a temperature of 10° C. or below.

22. The method of claim 17, carried out with formwork struck twice in one day.

23. A method of producing mortar or concrete objects with formwork struck twice in one day, the formwork being struck twice at a temperature of 10° C. or below.

24. The method of claim 17 used for the formation of concrete shells.

25. A method of accelerating the setting of a mortar or concrete, wherein the method comprises preparing mortar or concrete according to the method of claim 17.

26. A method of simultaneously increasing the open time and accelerating the setting of a mortar or concrete, wherein the method comprises preparing mortar or concrete according to the method of claim 17.

* * * * *